(12) United States Patent
Uematsu (10) Patent No.: US 10,759,473 B2
(45) Date of Patent: Sep. 1, 2020

(54) NEUTRAL POINT DETECTION DEVICE AND STEERING CONTROL SYSTEM

(71) Applicant: DENSO CORPORATION, Kariya, Aichi-pref. (JP)

(72) Inventor: Takumi Uematsu, Aichi-pref. (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 0 days.

(21) Appl. No.: 16/347,931

(22) PCT Filed: Oct. 12, 2017

(86) PCT No.: PCT/JP2017/037066
§ 371 (c)(1),
(2) Date: May 7, 2019

(87) PCT Pub. No.: WO2018/088109
PCT Pub. Date: May 17, 2018

(65) Prior Publication Data
US 2019/0351941 A1    Nov. 21, 2019

(30) Foreign Application Priority Data
Nov. 9, 2016 (JP) .................. 2016-218657

(51) Int. Cl.
*B62D 6/00* (2006.01)
*B60W 30/12* (2020.01)
(Continued)

(52) U.S. Cl.
CPC .............. *B62D 6/002* (2013.01); *B60R 21/00* (2013.01); *B60W 30/12* (2013.01); *B62D 6/00* (2013.01); *B62D 6/02* (2013.01)

(58) Field of Classification Search
CPC ............ B62D 6/002; B62D 6/02; B62D 6/00; B60W 30/12; B60R 21/00
See application file for complete search history.

(56) References Cited

U.S. PATENT DOCUMENTS

| | | | |
|---|---|---|---|
| 2007/0032946 A1* | 2/2007 | Goto ...................... | G01C 21/32 701/93 |
| 2011/0231087 A1* | 9/2011 | Johnson ............. | G01C 21/3461 701/533 |
| 2012/0143492 A1* | 6/2012 | Johnson ............. | G01C 21/3415 701/411 |

FOREIGN PATENT DOCUMENTS

| | | |
|---|---|---|
| JP | 3206532 B2 | 9/2001 |
| JP | 2006-224750 A | 8/2006 |

(Continued)

*Primary Examiner* — Russell Frejd
(74) *Attorney, Agent, or Firm* — Maschoff Brennan (57) ABSTRACT

A neutral point detection device is applied to a steering control system that obtains a steering angle of a steering device of a vehicle as a detection value by a steering angle sensor, and controls the steering device by means of the detection value. The neutral point detection device includes a straight determination unit that determines whether a road on which the vehicle is traveling is straight, a straight traveling determination unit that determines whether the vehicle is travelling straight along the road, a steering angle acquisition unit that obtains the detection value of the steering angle sensor, and a detection unit that detects the neutral point of the steering angle sensor based on the detection value obtained by the steering angle acquisition unit, when the straight determination unit determines that the road is straight and the straight traveling determination unit determines that the vehicle is traveling straight along the road.

5 Claims, 6 Drawing Sheets

(51) Int. Cl.
*B62D 6/02* (2006.01)
*B60R 21/00* (2006.01)

(56) References Cited

FOREIGN PATENT DOCUMENTS

| JP | 2006224750 A | * | 8/2006 |
|---|---|---|---|
| JP | 2014-046710 A | | 3/2014 |

* cited by examiner

$Vx \fallingdotseq V$ $Vy < Vyth$

FIG.7

$Vy > Vyth$

NEUTRAL POINT DETECTION DEVICE AND STEERING CONTROL SYSTEM

CROSS-REFERENCE TO RELATED APPLICATIONS

This application is a national stage application of PCT Application No. PCT/JP2017/037066, filed on Oct. 12, 2017, which claims priority to Japanese Patent Application No. 2016-218657 filed on Nov. 9, 2016, the disclosure of which is incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a neutral point detection device that is applicable to a steering control system.

BACKGROUND ART

Known lane departure prevention control detects travel section lines that are marked on a road, and controls a steering device such as to prevent a vehicle from departing from its traffic lane. With this control, in order to control the vehicle to follow curvature of the road, a steering angle sensor detects the steering angle of the steering device of the vehicle, and feedback control is executed to bring the steering angle to a target value.

In executing such feedback control, a deviation of the neutral point of the steering angle sensor, i.e. a deviation of a detected value of the steering angle may make the actual steering angle become excessively large or become excessively small in relation to the curvature of the road.

A neutral point learning device described in PTL 1 has been proposed as a solution for this issue. With the neutral point learning device of PTL 1, when detection values from the yaw rate sensor indicate that the vehicle is traveling along a straight line, the detected value of the steering angle is taken as the neutral point of the steering angle sensor.

PRIOR ART LITERATURE

Patent Literature

[PTL 1] Japan Patent No. 3206532

SUMMARY OF THE INVENTION

With the neutral point learning device of PTL 1, when steering operations are being repetitively performed, such as during a change of traffic lane, the detection values from the yaw rate sensor may momentarily indicate the straight travel condition irrespective of the steering operations that are actually being executed. Hence the accuracy of detecting the neutral point of the steering angle sensor may decrease. Furthermore, the detection values from the yaw rate sensor may vary in accordance with the acceleration or deceleration condition of the vehicle, the condition of the road surface, etc., so that even when the detection values indicate the straight travel condition, the vehicle may not actually be traveling along a straight line. That is to say, errors may arise in determining the neutral point of the steering angle sensor.

It is an objective of the present disclosure to provide a neutral point detection device which can accurately detect the neutral point of a steering angle sensor.

The present disclosure includes a neutral point detection device for application to a steering control system that is installed in a vehicle and that obtains a steering angle of a steering device as a detection value by a steering angle sensor and controls the steering device by means of the detection value. The neutral point detection device includes a straight determination unit that determines whether a road on which the vehicle is traveling is straight, and a straight traveling determination unit that determines whether the vehicle is travelling straight along the road. The neutral point detection device includes a steering angle acquisition unit that obtains the detection value of the steering angle sensor, and a detection unit that detects the neutral point of the steering angle sensor based on the detection value obtained by the steering angle acquisition unit, when the straight determination unit determines that the road is straight and the straight traveling determination unit determines that the vehicle is traveling straight along the road.

Even when the road on which the vehicle is traveling is straight, there are many cases in which steering operations are performed whereby the vehicle does not travel straight along the road, such as when a lane change is being performed or when the vehicle is crossing the road. This may cause detected values of the steering angle sensor to be unstable in obtaining the neutral point of the steering angle sensor. Furthermore, if the road is curved, it is difficult to accurately obtain the curvature of the road, and the accuracy of detecting the relative angle between the road and the vehicle is low, so that it is difficult to determine whether the vehicle is traveling along the road. In that respect, the above configuration enables the neutral point of the steering angle sensor to be determined at times when the road is straight, making it possible to determine, with higher accuracy, whether the vehicle is traveling straight along that road. Furthermore, since the neutral point of the steering angle sensor is determined when the vehicle is traveling straight along that road, the neutral point of the steering angle sensor can be determined at times when vehicle is traveling without steering operations being performed. Hence the neutral point of the steering angle sensor can be obtained more accurately.

BRIEF DESCRIPTION OF THE DRAWINGS

The above objectives and other objectives, features and advantages of the present disclosure are described more clearly in the following detailed description, referring to the appended drawings.

The drawings are as follows.

DESCRIPTION OF THE EMBODIMENTS

A steering control system having a neutral point detection device according to the present embodiment is installed in a vehicle, and controls a steering device of the vehicle.

Figure 1:
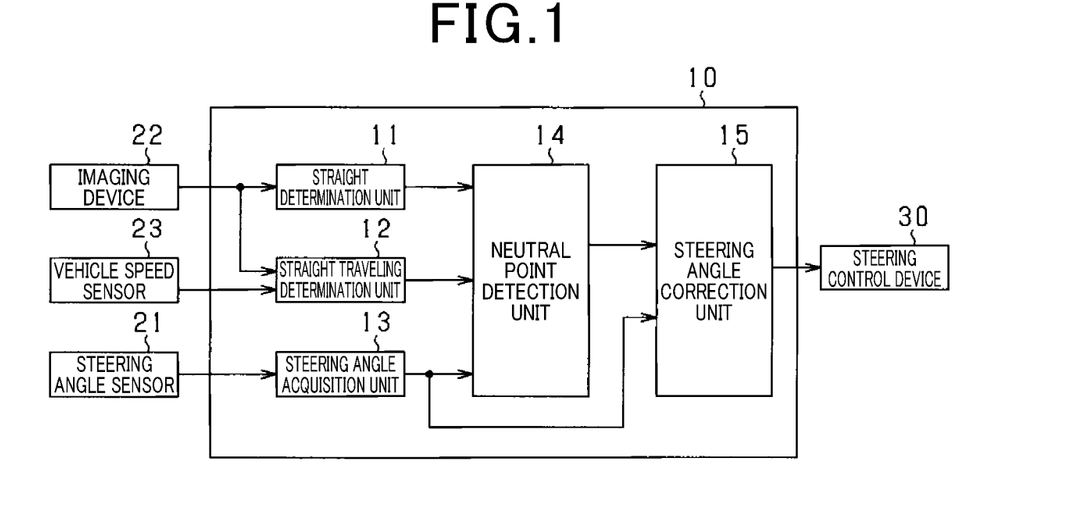
FIG. 1 is a diagram showing the configuration of a steering control system.

As shown in FIG. 1, the steering control system has a configuration that includes a neutral point detection device 10, sensor devices 21~23, and a steering control device 30. A steering angle sensor 21, a imaging device 22 and a vehicle speed sensor 23 are provided as the sensor devices.

The steering angle sensor 21 is attached to the rotation shaft of the steering wheel that is in the passenger compartment of the vehicle, and detects an amount of angular rotation of that rotation shaft from a neutral point θ0 as a steering angle θ.

The imaging device 22 is a CCD camera, or CMOS image sensor, infra-red camera or the like. The imaging device 22 captures images of the surroundings of the vehicle, including the road on which the vehicle is traveling, and generates image data that express the captured images. The imaging device 22 is attached at a prescribed height on the vehicle, at a central position with respect to the width direction, and captures images of a region that extends ahead of the vehicle within a prescribed angular range, from a bird's eye viewpoint.

The vehicle speed sensor 23 is provided on a rotation axis that transmits power to the wheels of the vehicle, and calculates the vehicle speed V based on the speed of the rotation axis.

The steering control device 30 controls the steering device, using detection values from the steering angle sensor 21. Specifically, a target value of angle of the front wheels of the vehicle is inputted to the steering control device 30, and the difference between the target value of angle and a current angle of the front wheels is calculated. The target value of angle is an angle that is required for the vehicle to travel along the road, and is derived with the curvature C and the vehicle speed V acquired from the vehicle speed sensor 23 as a variable. The current angle of the front wheels is obtained by dividing the steering angle θ by an overall gear ratio.

The difference between the target value of angle and the current angle of the front wheels is calculated as an error quantity, and a feedback control quantity in controlling the steering device is calculated from this error quantity. The greater the absolute value of the error quantity, the greater becomes the feedback control quantity, and the steering device is controlled to rotate in a direction to make the error quantity approach zero.

In controlling the steering device by the steering control device 30, if a deviation arises between the steering angle θ detected by the steering angle sensor 21 and the actual steering angle, then even if feedback control is performed, the difference between the target angle of the front wheels and the current angle of the front wheels may not converge. For that reason, when feedback control is performed, an allowable error is predetermined as a value which permits the difference between the target angle of the front wheels and the current angle of the front wheels to converge sufficiently. That allowable error can be defined for example as 3° in the value of the steering angle θ. However the allowable error is not necessarily defined with respect to the value of the steering angle θ, and it would be equally possible for it to be defined with respect to the front wheel angle.

In controlling the steering device by the steering control device 30 in that way, if there is a deviation in the neutral point θ0 of the steering angle sensor 21, then there will be cases in which it becomes difficult to control the steering device such that the vehicle will follow travel section lines.

Figure 2:
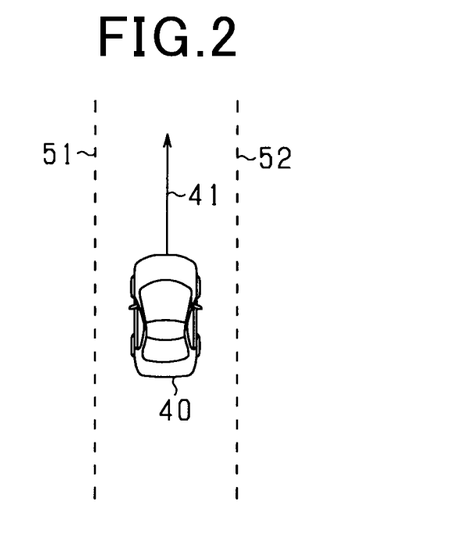
FIG. 2 is a diagram showing a case in which a vehicle is traveling along a straight section of a road.
Figure 3A:
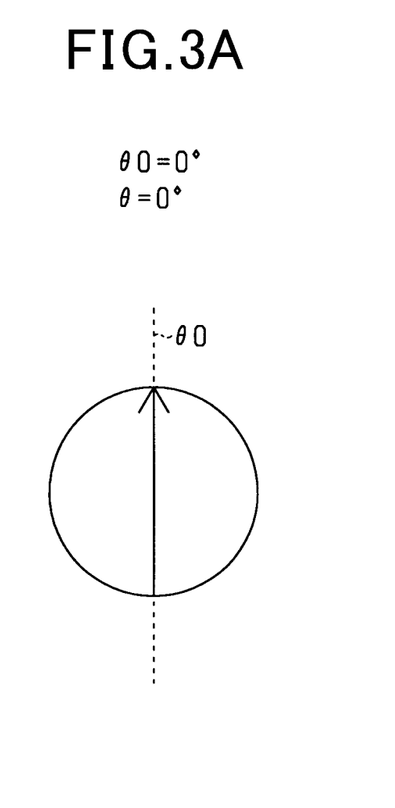
FIG. 3A is a diagram showing a detection value from a steering angle sensor with no error in a state illustrated in FIG. 2.
Figure 3B:
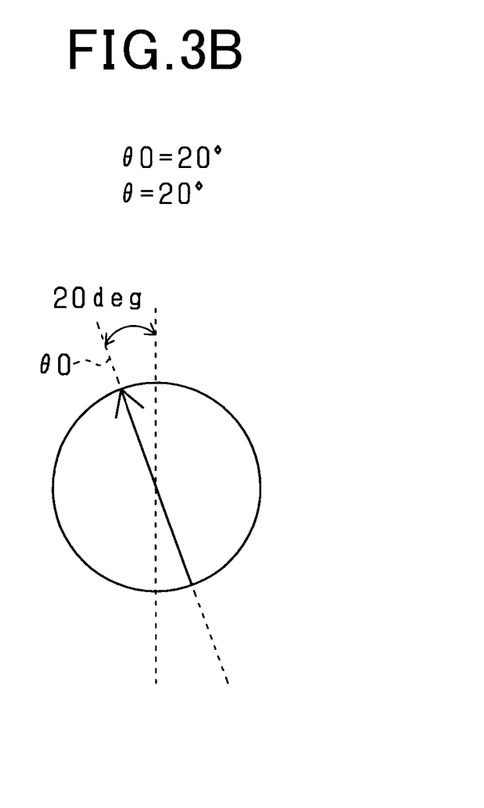
FIG. 3B is a diagram showing a detection value from the steering angle sensor with an error in a state illustrated in FIG. 2.

Firstly, as shown in FIG. 2, a case will be described in which a pair of travel section lines 51, 52 marked on the road are straight, and a vehicle 40 is traveling along a road that is sectioned by these travel section lines 51, 52. If there is no deviation in the neutral point θ0 of the steering angle sensor 21, that is to say the neutral point θ0 is 0°, then as shown in FIG. 3A, the steering angle θ will be detected as 0°. On the other hand, if a deviation arises in the neutral point θ0 of the steering angle sensor 21, for example if the neutral point θ0 is 20°, then as shown in FIG. 3B, the steering angle θ will be detected as 20°.

Figure 4:
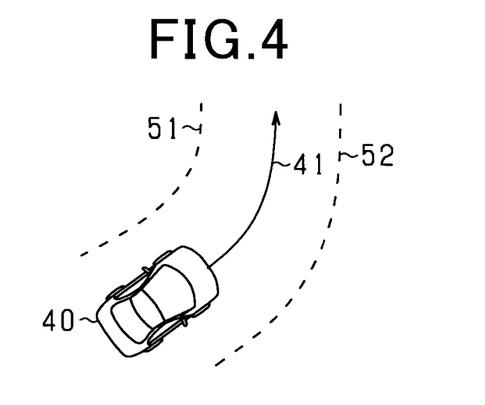
FIG. 4 is a diagram showing a case in which a vehicle is traveling along a curved section of a road.
Figure 5A:
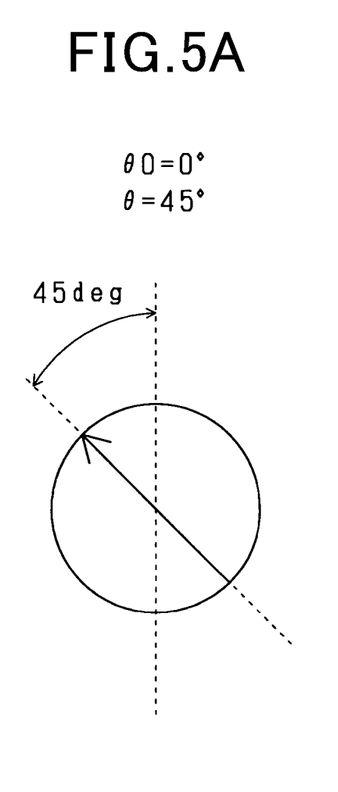
FIG. 5A is a diagram showing a detection value from a steering angle sensor with no error in a state illustrated in FIG. 4.
Figure 5B:
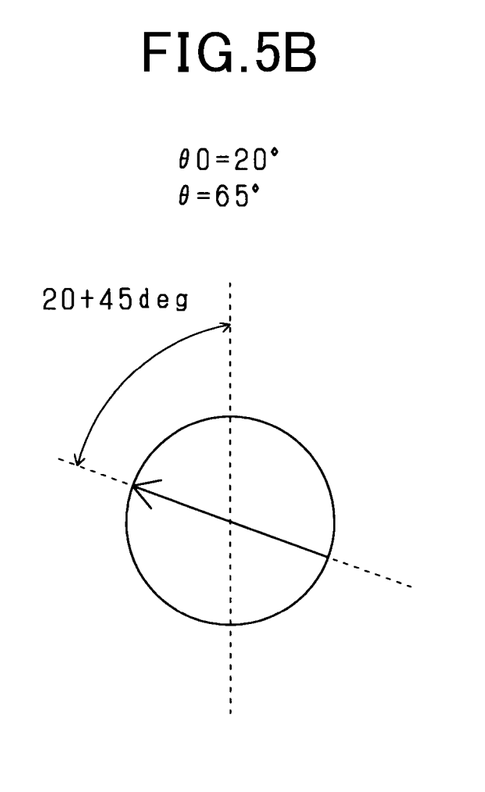
FIG. 5B is a diagram showing a detection value from the steering angle sensor with an error in a state illustrated in FIG. 4.

If as shown in FIG. 4 the pair of travel section lines 51, 52 marked on the road are curved, and the vehicle 40 is traveling along the road that is sectioned by these travel section lines 51, 52, then the steering device will be operated in accordance with the curvature C of the road and the vehicle speed V. If there is no deviation in the neutral point θ0 of the steering angle sensor 21, that is to say the neutral point θ0 is 0°, then as shown in FIG. 5A, the steering angle θ detected by the steering angle sensor 21 is detected as 45°. On the other hand, if a deviation arises in the neutral point θ0 of the steering angle sensor 21, for example if the neutral point θ0 is 20°, then as shown in FIG. 5B, the steering angle θ will be detected as 65°.

As described above, if there is a deviation in the neutral point θ0, then the detection values from the steering angle sensor 21 may be greater or smaller than the actual steering angle θ. If the detection values from the steering angle sensor 21 are greater than the actual steering angle θ, then it will be difficult to attain the steering angle θ that is required for controlling the steering device. On the other hand, if the detection values from the steering angle sensor 21 are smaller than the actual steering angle θ, then there is a danger that the steering angle θ will become larger than the steering angle θ required for controlling the steering device.

Hence the neutral point detection device 10 that is provided in the steering control system of the present embodiment detects the neutral point θ0, and the steering control device 30 executes control by using the value of that neutral point θ0. Returning to FIG. 1, the neutral point detection device 10 has a straight determination unit 11 and a straight traveling determination unit 12.

The straight determination unit 11 determines whether the road on which the vehicle is traveling is straight. Specifically, based on such factors as variations in luminance in the horizontal direction of an image acquired from the imaging device 22, edge points are extracted from the image data, as candidate section lines. The Hough transform is applied to the extracted edge points, so that feature points are obtained. Connecting the feature points enables the shapes of one or more section lines to be recognized. The recognized shapes of one or more section lines constitute section line information. If a pair of section lines are recognized, then the radius of curvature R of an arc that approximates to the shape of the section lines is obtained, based on the section line information. The curvature C is then calculated as the inverse of the radius of curvature R. At that time, an average value of the curvature C of one of the section lines of the pair and the curvature C of the other of the section lines of the pair can be calculated as the curvature C of the road.

When the curvature C has thus been calculated, a determination is made as to whether that curvature C is smaller than a curvature threshold value Cth. The curvature threshold value Cth is set as a value whereby, when the curvature C of the road on which the vehicle is traveling is equal to the curvature threshold value Cth, the steering angle θ will be smaller than the allowable error. If the curvature C is smaller than the curvature threshold value Cth, then the straight determination unit 11 determines that the conditions for detecting the neutral point θ0 of the steering angle sensor 21 are satisfied.

The straight traveling determination unit 12 determines whether the vehicle 40 is traveling straight along the road. Firstly, for calculating the angle φ between the travel direction 41 of the vehicle 40 and each of the travel section lines 51, 52, an angle between each of the travel section lines 51, 52 and a center line in the left and right direction in an image obtained from the imaging device 22 is calculated. That angle is then converted to the angle φ between the travel direction 41 of the vehicle 40 and each of the travel section lines 51, 52. The vehicle speed V from the vehicle speed sensor 23 is then multiplied by the sine of the angle φ to calculate the lateral speed Vy, which is the speed at which the vehicle 40 is traveling in a direction orthogonal to the road. It should be noted that the longitudinal speed Vx, which is the speed in a direction along the road, is obtained by multiplying the vehicle speed V by the cosine of the angle φ.

The straight traveling determination unit 12 compares the lateral speed Vy, calculated set forth above, with a speed threshold value Vyth. The speed threshold value Vyth is determined based on a value of the lateral speed Vy at which the angle φ between the travel direction 41 of the vehicle 40 and each of the travel section lines 51, 52 becomes smaller than the allowable error. That is to say, the higher the value of vehicle speed V obtained from the vehicle speed sensor 23, the higher becomes the speed threshold value Vyth. If the lateral speed Vy is lower than the speed threshold value Vyth, the straight traveling determination unit 12 determines that the conditions for detecting the neutral point θ0 of the steering angle sensor 21 are satisfied.

Figure 6:
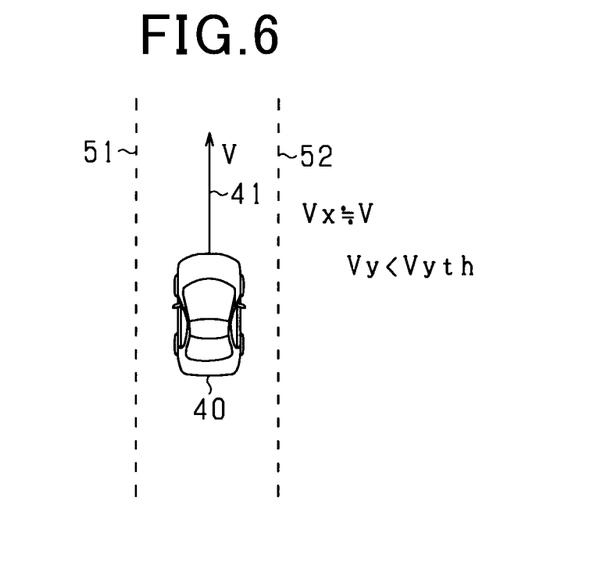
FIG. 6 is a diagram showing a case in which a road is straight and the vehicle is traveling along the road.

FIG. 6 illustrates a case in which the straight determination unit 11 determines that the road is straight, and the straight traveling determination unit 12 determines that the vehicle 40 is traveling straight along the road. In that case, it can be said that this is a circumstance in which it is desirable for detecting the neutral point θ0 of the steering angle sensor 21, in order to operate the steering device such that the vehicle 40 will follow the road. If the vehicle 40 is traveling along the road as shown in FIG. 6, the longitudinal speed Vx is approximately equal to the vehicle speed V, and the lateral speed Vy is close to zero. That is to say, if the lateral speed Vy is smaller than the speed threshold value Vyth, the straight traveling determination unit 12 determines that the vehicle 40 is traveling straight along the road. It is determined that the conditions for detecting the neutral point φ0 are satisfied.

Figure 7:
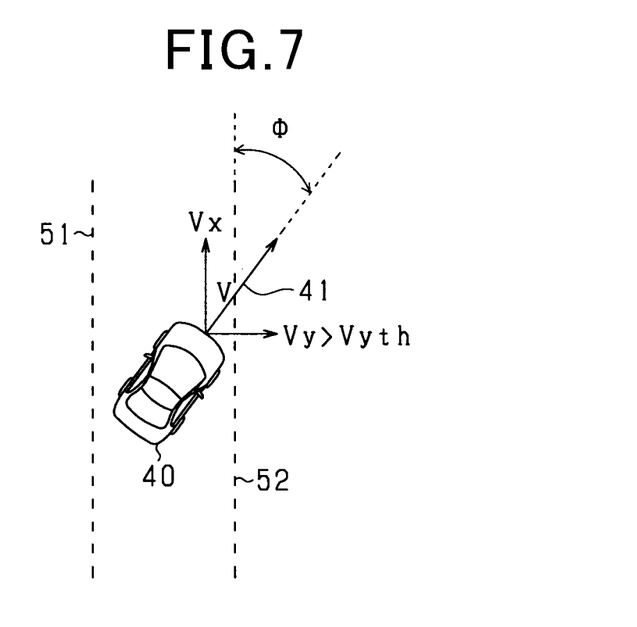
FIG. 7 is a diagram showing a case in which a road is straight and the vehicle is not traveling along the road.

FIG. 7 illustrates a case in which the straight determination unit 11 determines that the road is straight, while the straight traveling determination unit 12 determines that the vehicle 40 is not traveling straight along the road. There are many cases such as that shown in FIG. 7, in which the vehicle 40 is not traveling along a road, for example when the vehicle 40 is traveling with the steering device being operated such as to perform a lane change, or to cross the road. That is to say, there is a high probability that operations of the steering device are being performed which are undesirable at a time when detecting the neutral point θ0 of the steering angle sensor 21. If as shown in FIG. 7 the vehicle 40 is not traveling along the road, then the smaller the angle φ between the vehicle 40 and the travel section lines 52, the smaller will become the longitudinal speed Vx, while the greater the angle φ, the higher will become the lateral speed Vy. If the lateral speed Vy is smaller than the speed threshold value Vyth, then it is determined that the vehicle 40 is not traveling straight along the road.

Figure 8:
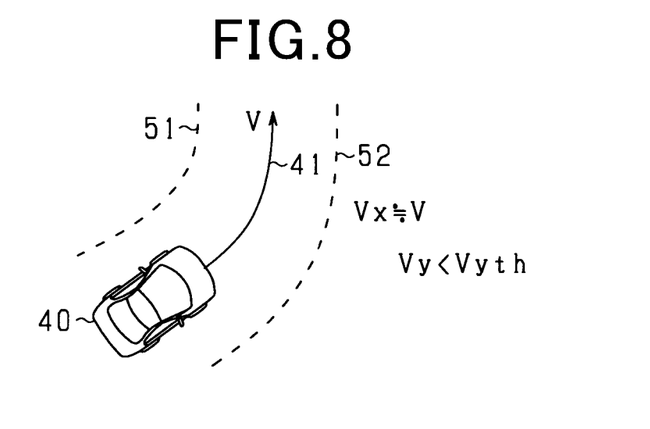
FIG. 8 is a diagram showing a case in which a road is curved and the vehicle is traveling along the road.

FIG. 8 illustrates a case in which the straight determination unit 11 determines that the road is not straight, and the straight traveling determination unit 12 determines that the vehicle 40 is traveling directly along the road. Since images of the travel section lines 51, 52 marked on the road are captured from a bird's eye viewpoint, it is difficult for the curvature C to be accurately calculated when the road is not straight, and moreover in some cases the curvature C may not be constant. That is to say, there may be a difference between the calculated curvature C and the actual curvature C. In addition, in obtaining the neutral point θ0 of the steering angle sensor 21, it is necessary to determine whether the vehicle 40 is traveling along the road, while if the road is curved then it is difficult to accurately obtain the angle φ between the vehicle 40 and the travel section lines 51, 52. Hence when the curvature C is greater than the curvature threshold value Cth, it is determined that the conditions for detecting the neutral point θ0 of the steering angle sensor 21 are not satisfied.

Figure 9:
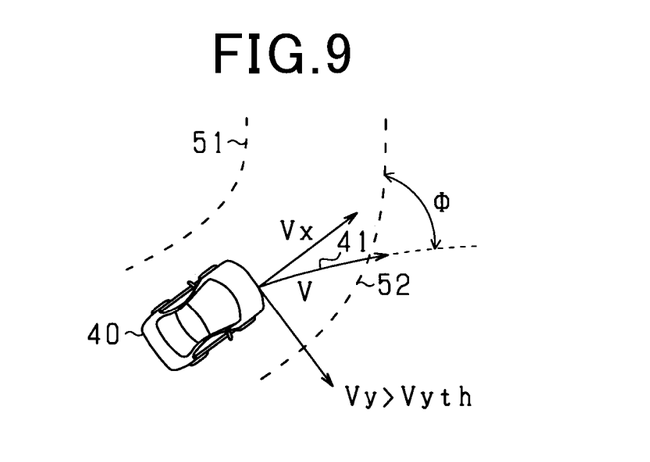
FIG. 9 is a diagram showing a case in which a road is curved and the vehicle is not traveling along the road.

FIG. 9 illustrates a case in which the straight determination unit 11 determines that the road is curved, while the straight traveling determination unit 12 determines that the vehicle 40 is not traveling directly along the road. In that case, the vehicle 40 is in the process of making a lane change, or is crossing the road. Furthermore it is difficult for the curvature C of the road to be accurately calculated, and the accuracy of the angle φ between the vehicle 40 and each of the travel section lines 51, 52 becomes low. Hence it is determined that the conditions for detecting the neutral point θ0 of the steering angle sensor 21 are not satisfied.

Returning to the description of FIG. 1, the steering angle acquisition unit 13 obtains values of the steering angle θ, detected by the steering angle sensor 21, at prescribed intervals, and transmits the obtained values of steering angle θ to the neutral point detection unit 14. If the straight determination unit 11 determines that the road is straight, and the straight traveling determination unit 12 determines that the vehicle 40 is traveling along the road, then the neutral point detection unit 14 obtains the neutral point θ0 of the steering angle sensor 21 based on the steering angle θ that is acquired from the steering angle acquisition unit 13. In obtaining this neutral point θ0, detected values of the steering angle θ can be temporarily stored during a prescribed period, and an average value of these detected values can be calculated as the neutral point θ0, or an instantaneous detected value of steering angle θ can be calculated as the neutral point θ0. The detected value of neutral point θ0 is then stored in an unillustrated memory device, and is transmitted to a steering angle correction unit 15.

The steering angle correction unit 15 acquires the value of the steering angle θ from the steering angle acquisition unit 13, and acquires the value of the neutral point θ0 of the steering angle sensor 21 from the neutral point detection unit 14. A corrected value of the steering angle θ is then calculated by subtracting the neutral point θ0 from the steering angle θ. The corrected value of the steering angle θ thus obtained is inputted to the steering control device 30, which executes feedback control of the steering device by using that corrected value.

It should be noted that the steering angle correction unit 15 could be provided in the steering control device 30, instead of in the neutral point detection device 10.

Figure 10:
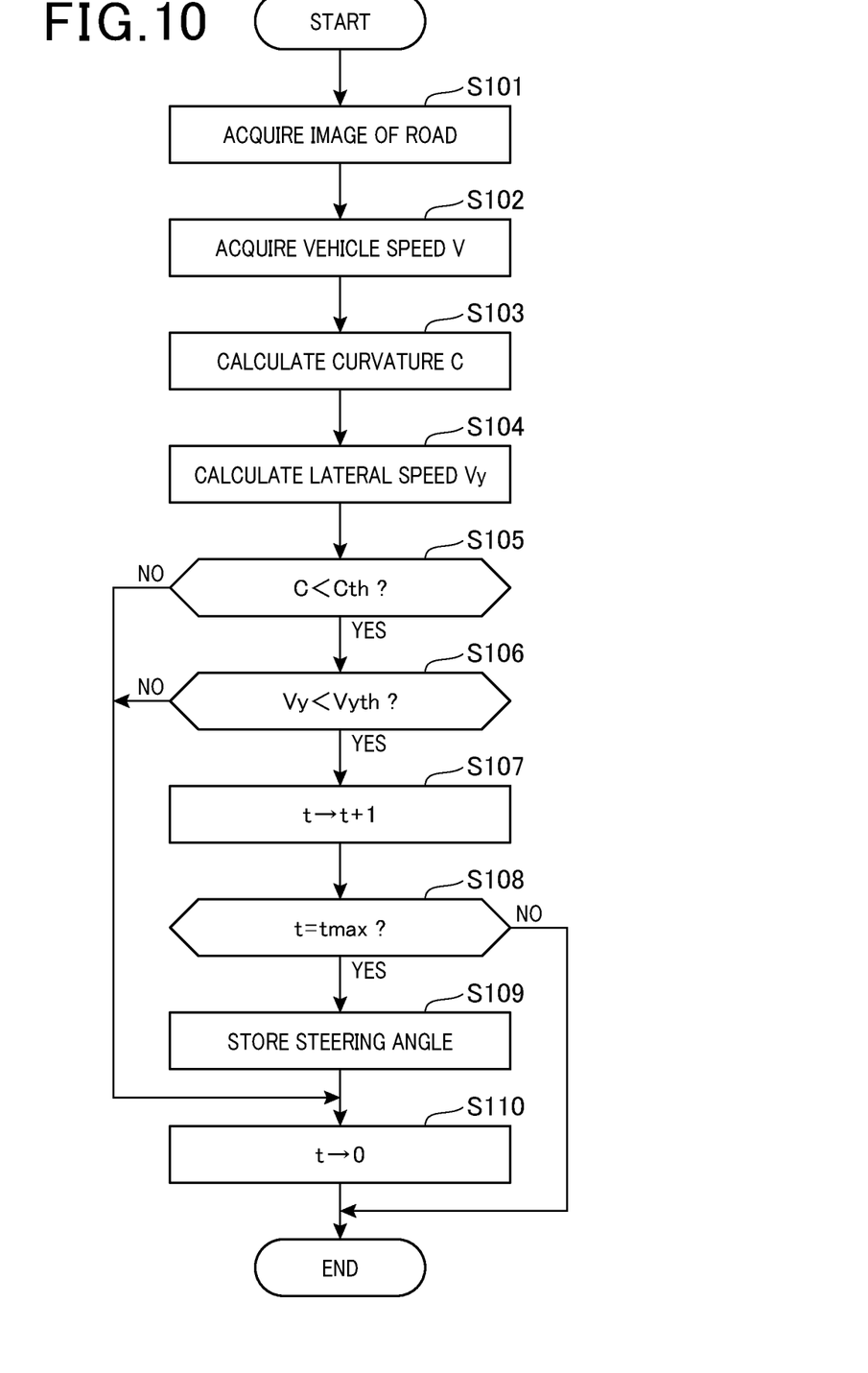
FIG. 10 is a flow diagram of processing executed by a neutral point detection device.

A series of processing that is executed by the neutral point detection device 10 described above will be described referring to the flow diagram of FIG. 10. The processing of the flow diagram of FIG. 10 is repetitively executed in each of prescribed control periods.

Firstly, in step S101, an image of the road is acquired from a imaging device 22, and in step S102 the vehicle speed V is acquired from the vehicle speed sensor 23. Next in step S103, the curvature C of the road is calculated based on the acquired road image. In step S104, the lateral speed Vy of the vehicle 40 is calculated. Specifically, the vehicle speed Vy is calculated by multiplying the vehicle speed V by the sine of an angle between the direction of travel 41 of the vehicle 40 and travel section lines 51, 52.

When the curvature C and the vehicle speed V have been obtained, the processing advances to step S105, in which a determination is made as to whether the curvature C is smaller than the curvature threshold value Cth. If a positive determination is made in step S105, that is to say if the curvature C is smaller than the curvature threshold value Cth, then the processing advances to step S106. In step S106 a determination is made as to whether the lateral speed Vy is lower than the speed threshold value Vyth. If a positive determination is made in step S106, that is to say if the lateral speed Vy is lower than the speed threshold value Vyth, the processing advances to step S107. In step S107 a counter value t is incremented, and then in step S108 a determination is made as to whether the counter value t has reached a maximum value tmax. If there is a negative determination in step S108, that is to say, if the counter value t has not yet reached the maximum value tmax, the series of processing is terminated. On the other hand, if there is a positive determination in step S108, that is to say, if the counter value t has reached the maximum value tmax, then processing advances to step S109.

In step S109 the steering angle θ that has been detected by the steering angle sensor 21 is stored in a storage as the neutral point θ0. In this processing of step S109, it would be equally possible to temporarily store the detected values of the steering angle θ during a prescribed period for example during a period from the start of counting the counter value t until the maximum count value tmax is reached, and to take the average of these detected values as the neutral point θ0. Processing then advances to step S110, in which the counter value t is reset, and the series of processing is terminated.

If there is a negative determination in step S105 or in step S106, the processing advances to step S110, in which the counter value t is reset, and the series of processing is terminated.

On the other hand, it would be equally possible to arrange that, if there is a negative determination in step S105 or in step S106, instead of advancing immediately to step S110, the processing advances to step S110 if the negative determination is continued over a prescribed period.

The above configuration of the neutral point detection device 10 of the present embodiment achieves the following effects.

Even when the road on which the vehicle 40 is traveling is straight, there are many cases in which steering operations are performed whereby the vehicle 40 does not travel straight along the road, such as when a lane change is being performed or when the vehicle is crossing the road. This may cause detected values of the steering angle sensor 21 to be unstable in obtaining the neutral point θ0 of the steering angle sensor 21. Furthermore if the road is curved, it is difficult to accurately obtain the curvature C of the road, and the accuracy of detecting the relative angle between the road and the vehicle 40 is low, so that it is difficult to determine whether the vehicle 40 is traveling along the road. In that respect, with the present embodiment, the neutral point θ0 of the steering angle sensor 21 is determined at times when the road is straight, making it possible to determine, with higher accuracy, whether the vehicle 40 is traveling straight along that road. Furthermore, since the neutral point θ0 of the steering angle sensor 21 is determined when the vehicle 40 is traveling straight along that road, the neutral point θ0 of the steering angle sensor 21 can be determined at times when vehicle 40 is traveling without steering operations being performed. Hence the neutral point θ0 of the steering angle sensor 21 can be obtained more accurately.

The value used for the curvature threshold value Cth is such that, when the curvature C of the road on which the vehicle is traveling is equal to that curvature threshold value Cth, the steering angle θ becomes smaller than the allowable error, and hence, even when the neutral point θ0 of the steering angle θ is determined based on a road having a curvature C that is not zero but is smaller than the threshold value Cth, θ0 can be made smaller than the allowable error.

Since, in determining whether the road is straight, a determination is made as to whether the curvature C is smaller than the curvature threshold value Cth, the opportunities for acquiring the neutral point θ0 can be increased.

A value of the speed threshold value Vyth is used whereby the angle φ between the direction of travel 41 of the vehicle 40 and the road becomes smaller than the allowable error, and hence, even when the neutral point θ0 of the steering angle θ is determined in a case in which the lateral speed Vy is lower than the speed threshold value Vyth but is not zero, the neutral point θ0 can be made smaller than the allowable error.

Since, in determining whether the vehicle 40 is traveling straight along the road, a determination is made as to whether the lateral speed Vy is smaller than the speed threshold value Vyth, the opportunities for acquiring the neutral point θ0 can be increased.

MODIFIED EXAMPLES

With the embodiment, a determination as to whether the road is straight is made by detecting a pair of travel section lines 51, 52. However it would be equally possible to determine whether the road is straight by detecting a single travel section line. In that case, if the vehicle 40 deviates excessively from a travel section line, it will be difficult to determine whether the vehicle 40 is following that travel section line. Hence, the determination as to whether the road is straight and the determination as to whether the vehicle 40 is traveling straight along the road could be performed at a time when the lateral separation between the vehicle 40 and the travel section line is within a prescribed amount.

With the embodiment, the curvature C of the road is obtained by detecting a pair of travel section lines 51, 52. However it would be equally possible to detect a roadside structure such as a guard rail, etc., or a level difference between the road and the road shoulder or a sidewalk, etc., and to determine whether an end of the structure or level difference, etc., which is at the side of the vehicle 40, is straight. Furthermore in that case, instead of detecting the structure or level difference by means of the imaging device 22, the detection could be performed by using a radar device or the like.

With the embodiment, the curvature C of the road is obtained by detecting a pair of travel section lines 51, 52. However it would be equally possible to determine whether the road is straight by using a curvature C that is included in map data that have been stored in a navigation device or the like, installed in the vehicle 40.

A determination as to whether the vehicle 40 is traveling straight along the road could be made by using position information for the vehicle 40, obtained from GPS signals, etc., and map data which have been stored in a navigation device or the like.

With the embodiment, a determination as to whether the vehicle 40 is traveling straight along the road is made by determining whether the lateral speed Vy is smaller than the speed threshold value Vyth. However it would be equally possible to determine whether the vehicle 40 is traveling straight along the road by determining whether the angle φ between the travel direction 41 of the vehicle 40 and the travel section lines 51, 52 is smaller than an angle threshold value φth.

With the embodiment, the straight determination unit 11 determines whether the road is straight based on the curvature C. However it would be equally possible to determine whether the road is straight based on the radius of curvature R, which is the reciprocal of the curvature C. In that case, it could be determined that the road is straight if the radius of curvature R is greater than a curvature radius threshold value Rth. It should be noted that, in the same way as for the curvature C, the radius of curvature R could be determined based on an allowable error in the steering control.

Although the present disclosure has been described in accordance with embodiments, it is to be understood that the present disclosure is not limited to these embodiments and structures. The present disclosure encompasses various modified examples, and alterations that come within an equivalent scope. Furthermore various combinations and forms, including combinations and forms that contain more than one or less than one of the elements, also come within the scope and conceptual range of the present disclosure.

The invention claimed is:

1. A neutral point detection device for application to a steering control system that is installed in a vehicle and that obtains a steering angle of a steering device as a detection value by a steering angle sensor and controls the steering device by means of the detection value;
    wherein the neutral point detection device comprises:
    a straight determination unit that determines whether a road on which the vehicle is traveling is straight;
    a straight traveling determination unit that determines whether the vehicle is straight along the road;
    a steering angle acquisition unit that obtains the detection value of the steering angle sensor; and
    a detection unit that detects a neutral point of the steering angle sensor based on the detection value obtained by the steering angle acquisition unit, in response to the straight determination unit determining that the road is straight and the straight traveling determination unit determining that the vehicle is traveling straight along the road,
    wherein
    an allowable error in the detection value is predetermined in response to the steering control system controlling the steering device by means of the detection value;
    in response to a curvature of the road being smaller than a curvature threshold value, the straight determination unit determines that the road is straight; and
    the curvature threshold value is determined based on the steering angle becoming smaller than the allowable error in response to the vehicle traveling along a road having a curvature that is equal to the curvature threshold value.

2. The neutral point detection device according to claim 1, wherein
    the straight determination unit determines that the road is straight in response to it being determined that a travel section line marked on the road is straight.

3. A steering control system installed in a vehicle, for controlling a steering angle of a steering device of that vehicle, comprising:
    a steering angle sensor that obtains the steering angle as a detection value;
    a neutral point detection device according to claim 1;
    a correction unit that corrects the detection value obtained by the steering angle sensor, by means of a neutral point that is determined by the neutral point detection device; and
    a control device that controls the steering device based on a detection value that is corrected by the correction unit.

4. A neutral point detection device for application to a steering control system that is installed in a vehicle and that obtains a steering angle of a steering device as a detection value by a steering angle sensor and controls the steering device by means of the detection value;
    wherein the neutral point detection device comprises:
    a straight determination unit that determines whether a road on which the vehicle is traveling is straight;
    a straight traveling determination unit that determines whether the vehicle is straight along the road;
    a steering angle acquisition unit that obtains the detection value of the steering angle sensor; and
    a detection unit that detects a neutral point of the steering angle sensor based on the detection value obtained by the steering angle acquisition unit, in response to the straight determination unit determining that the road is straight and the straight traveling determination unit determining that the vehicle is traveling straight along the road,
    wherein
    an allowable error in the detection value is predetermined in response to the steering control system controlling the steering device by means of the detection value;
    in response to a lateral speed, expressing a speed of the vehicle in a direction orthogonal to the road, being smaller than a speed threshold value, the straight traveling determination unit determines that the vehicle is traveling straight along the road; and
    the speed threshold value is determined based on a value of the lateral speed at which an angle between a travel direction of the vehicle and the road becomes smaller than the allowable error.

5. A neutral point detection device for application to a steering control system that is installed in a vehicle and that obtains a steering angle of a steering device as a detection value by a steering angle sensor and controls the steering device by means of the detection value;
wherein the neutral point detection device comprises:
a straight determination unit that determines whether a road on which the vehicle is traveling is straight;
a straight traveling determination unit that determines whether the vehicle is straight along the road;
a steering angle acquisition unit that obtains the detection value of the steering angle sensor; and
a detection unit that detects a neutral point of the steering angle sensor based on the detection value obtained by the steering angle acquisition unit, in response to the straight determination unit determining that the road is straight and the straight traveling determination unit determining that the vehicle is traveling straight along the road,
wherein
an allowable error in the detection value is predetermined in response to the steering control system controlling the steering device by means of the detection value;
in response to an angle between a travel direction of the vehicle and the road being smaller than an angle threshold value, the straight traveling determination unit determines that the vehicle is traveling straight along the road; and
the angle threshold value is determined as a value that is smaller than the allowable error.

* * * * *